United States Patent
Subbaraya et al.

(10) Patent No.: US 11,205,084 B2
(45) Date of Patent: Dec. 21, 2021

(54) METHOD AND SYSTEM FOR EVALUATING AN IMAGE QUALITY FOR OPTICAL CHARACTER RECOGNITION (OCR)

(71) Applicant: Wipro Limited, Bangalore (IN)

(72) Inventors: Prashanth Krishnapura Subbaraya, Bengaluru (IN); Raghavendra Hosabettu, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/835,017

(22) Filed: Mar. 30, 2020

(65) Prior Publication Data

US 2021/0256284 A1 Aug. 19, 2021

(30) Foreign Application Priority Data

Feb. 17, 2020 (IN) .............................. 202041006798

(51) Int. Cl.
*G06K 9/00* (2006.01)
*G06K 9/03* (2006.01)
*G06K 9/34* (2006.01)

(52) U.S. Cl.
CPC ............. *G06K 9/036* (2013.01); *G06K 9/344* (2013.01); *G06K 2209/01* (2013.01)

(58) Field of Classification Search
CPC ............... G06K 9/00–86; G06K 2209/01–015
See application file for complete search history.

(56) References Cited

U.S. PATENT DOCUMENTS

| | | | |
|---|---|---|---|
| 8,126,197 B2 | 2/2012 | Jones et al. | |
| 8,254,681 B1 * | 8/2012 | Poncin | G06F 40/20 382/180 |
| 9,576,210 B1 * | 2/2017 | Liu | G06T 11/60 |
| 9,672,510 B2 * | 6/2017 | Roach | G06K 9/00442 |
| 10,691,984 B2 * | 6/2020 | Loginov | G06K 9/40 |
| 2005/0058341 A1 * | 3/2005 | Maruoka | G06K 9/4647 382/167 |
| 2006/0204099 A1 * | 9/2006 | Kimura | G06K 9/036 382/182 |

(Continued)

FOREIGN PATENT DOCUMENTS

CN 106651854 A 5/2017

*Primary Examiner* — Sean T Motsinger (74) *Attorney, Agent, or Firm* — Finnegan, Henderson, Farabow, Garrett & Dunner, LLP (57) ABSTRACT

The present subject matter is related in general to the field of image processing, disclosing method and system for evaluating an image quality for Optical Character Recognition (OCR) Image evaluation system receives image comprising optical character data. The image evaluation system determines image parameter value for each of one or more image parameters of the image. The image parameter value for each of the one or more image parameters is determined for plurality of binary image segments identified in the image. The image evaluation system determines suitability value and impact value of the image, based on the image parameter value for each of the image parameters determined for the image. The image evaluation system determines quality score for the image, based on the suitability value and the impact value. The image is transmitted for processing before the OCR, upon determining the quality score to be above overall pre-defined threshold value.

15 Claims, 6 Drawing Sheets

(56) References Cited

U.S. PATENT DOCUMENTS

| | | | |
|---|---|---|---|
| 2009/0141932 A1* | 6/2009 | Jones | G06K 9/036 382/100 |
| 2009/0147988 A1* | 6/2009 | Jones | H04N 1/32101 382/100 |
| 2010/0188419 A1* | 7/2010 | Ratnakar | G06T 11/00 345/619 |
| 2011/0222768 A1* | 9/2011 | Galic | G06K 9/4638 382/170 |
| 2012/0128250 A1* | 5/2012 | Petrou | G06K 9/036 382/182 |
| 2012/0134590 A1* | 5/2012 | Petrou | G06K 9/00483 382/182 |
| 2013/0022231 A1 | 1/2013 | Nepomniachtchi et al. | |
| 2013/0155474 A1* | 6/2013 | Roach | G06Q 20/14 358/505 |
| 2014/0270528 A1* | 9/2014 | Ramos | G06T 7/73 382/182 |
| 2016/0309085 A1* | 10/2016 | Ilic | G06T 11/60 |
| 2018/0011974 A1* | 1/2018 | Schneider | G06Q 50/22 |
| 2018/0157906 A1* | 6/2018 | Loginov | G06K 9/036 |
| 2018/0157907 A1* | 6/2018 | Loginov | G06K 9/00442 |
| 2018/0182086 A1* | 6/2018 | Ma | G06K 9/036 |
| 2019/0065880 A1* | 2/2019 | Loginov | G06K 9/6274 |

\* cited by examiner

METHOD AND SYSTEM FOR EVALUATING AN IMAGE QUALITY FOR OPTICAL CHARACTER RECOGNITION (OCR)

TECHNICAL FIELD

The present subject matter is related in general to the field of image processing, and more particularly, but not exclusively to a method and a system for evaluating an image quality for Optical Character Recognition (OCR).

BACKGROUND

Generally, image processing can be crucial before converting image using Optical Character Recognition (OCR). The image processing can improve the quality of the image so that the OCR engine can provide accurate output. Further, some of the scanned images can be of poor quality and these images may be difficult to process during OCR. Even though the poor-quality image is converted using the OCR, the converted text from image may not be accurate. For example, bills/receipts may be submitted for reimbursement, wherein the submitted bills should be processed with good accuracy as the bills involve financial information. A small change/error in conversion during OCR, can lead to miscalculation and in turn financial loss. Hence, it may be required to check the quality of the image before conversion using OCR, so that the poor-quality images can be discarded.

One of the conventional methods disclose processing of scanned image for a quality feature such as brightness, by generating a sub-image. Another conventional method discloses determining quality vectors for image quality metrics for features. The image is being classified based on the vectors, as the image is acceptable or unacceptable in accordance with the threshold tests. However, the conventional methods do not disclose determining distortion of an image based on other image parameters or features and then determining if the image can be processed for OCR. Further, the conventional methods do not disclose correcting the image based on determining the distortion of the image based on various image parameters, to achieve better accuracy during OCR conversion.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for evaluating an image quality for Optical Character Recognition (OCR). The method includes receiving, by an image evaluation system, an image comprising optical character data. Further, the method includes determining, by the image evaluation system, an image parameter value for each of one or more image parameters of the image. The image parameter value for each of the one or more image parameters of the image comprises the image parameter value for each of the one or more image parameters determined for a plurality of binary image segments identified in the image. Furthermore, the method includes determining, by the image evaluation system, a suitability value and an impact value corresponding to the image, based on the image parameter value for each of the one or more image parameters determined for the image. Subsequently, the method includes determining, by the image evaluation system, a quality score for the image, based on the suitability value and the impact value. The image is transmitted for processing before the OCR, upon determining the quality score to be above an overall pre-defined threshold value.

Further, the present disclosure comprises an image evaluation system for evaluating an image quality for Optical Character Recognition (OCR). The image evaluation system includes a processor and a memory communicatively coupled to the processor. The memory stores processor-executable instructions, which, on execution, cause the processor to receive an image comprising optical character data. Further, the processor is configured to determine an image parameter value for each of one or more image parameters of the image. The image parameter value for each of the one or more image parameters of the image comprises the image parameter value for each of the one or more image parameters determined for a plurality of binary image segments identified in the image. Furthermore, the processor is configured to determine a suitability value and an impact value corresponding to the image, based on the image parameter value for each of the one or more image parameters determined for the image. Subsequently, the processor is configured to determine a quality score for the image, based on the suitability value and the impact value, wherein the image is transmitted for processing before the OCR, upon determining the quality score to be above an overall pre-defined threshold value.

Furthermore, the present disclosure comprises a non-transitory computer readable medium including instructions stored thereon that when processed by at least one processor causes an image evaluation system to perform operations comprising receiving an image comprising optical character data. Further, the instructions cause the processor to determine an image parameter value for each of one or more image parameters of the image. The image parameter value for each of the one or more image parameters of the image comprises the image parameter value for each of the one or more image parameters determined for a plurality of binary image segments identified in the image. Subsequently, the instructions cause the processor to determine a suitability value and an impact value corresponding to the image, based on the image parameter value for each of the one or more image parameters determined for the image. Finally, the instructions cause the processor to determine a quality score for the image, based on the suitability value and the impact value, wherein the image is transmitted for processing before the OCR, upon determining the quality score to be above an overall pre-defined threshold value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagram herein represents conceptual views of illustrative systems embodying the principles of the present subject matter. Similarly, it will be appreciated that any flow chart, flow diagram, state transition diagram, pseudo code, and the like represent various processes which may be substantially represented in computer readable medium and executed by a computer or a processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for evaluating an image quality for Optical Character Recognition (OCR). An image is provided to an image evaluation system, where image processing is performed to improve the quality of the image (i.e. corrected image). The image can be scanned image or captured image that comprises optical character data. Further, the corrected image is then sent to an OCR engine for converting the image to text format. The image may be retrieved, from an image capturing device directly, or from a database, to improve the quality of the image. The quality of scanned/captured images may be determined using image parameter values for various parameters of the image. The image evaluation system may analyse the image and take decisions on whether the scanned/captured image is suitable for processing through OCR. Further, the image evaluation system may perform necessary steps for processing the image to achieve better accuracy. The parameters of the image such as skewness, brightness, warping, and so on is corrected. Based on the combination of values of each image parameter and quality score of the entire image, the image evaluation system may decide on the processing/pre-processing steps that needs to be followed to achieve better accuracy in OCR.

The present disclosure enables the correction of images having poor quality due to low brightness, skewness, warp and so on, by determining image quality values to provide better accuracy during the OCR.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
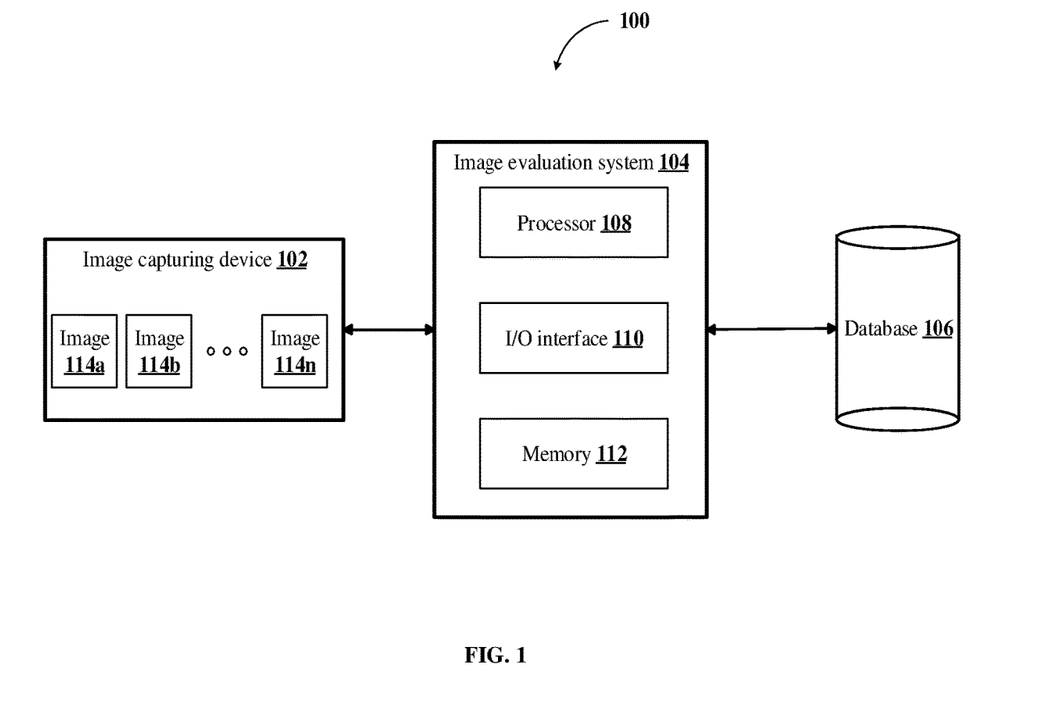
FIG. 1 illustrates an exemplary architecture for evaluating an image quality for Optical Character Recognition (OCR) in accordance with some embodiments of the present disclosure.

FIG. 1 illustrates an exemplary architecture 100 for evaluating an image quality for Optical Character Recognition (OCR) in accordance with some embodiments of the present disclosure.

The architecture 100 comprises an image capturing device 102, an image evaluation system 104, and a database 106. In an embodiment, the image capturing device 102 may obtain images 114a to 114n (herein after referred as image 114) by scanning or capturing the document/image (herein after referred as obtained image). For example, the image capturing device 102 can include at least one of, but not limited to, a scanner, a smartphone, a tablet, a wearable, a laptop, an Internet of Things (IoT) device, and the like. The obtained image also be retrieved by the image evaluation system 104 directly from a database 106. Further, the image evaluation system 104 can be implemented in at least one of, but not limited to, a smartphone, a tablet, a wearable, a laptop, an IoT device, a server and the like. The image evaluation system 104 can be a standalone device or a remote device or a cloud computing device. In an embodiment, the image evaluation system 104 may be associated with at least one of the image capturing device 102 and the database 106 via a communication network (not shown in the FIG. 1). The communication network may be at least one of a wired communication network and a wireless communication network.

The image evaluation system 104 may include a processor 108, an Input/Output (I/O) interface 110 and a memory 112. The I/O interface 110 may receive image from the image capturing device 102 or the database 106 in real-time. The database 106 can be a local or remote database and can be dedicated database or a shared database (such as biller database). As an example, the image may include, but not limited to, bills, receipts, invoices, financial documents, cheques, memos, coupons, and the like. In an embodiment, the processor 108 is configured to convert the received image to a binary image format. The binary image format may be segmented (herein after referred as binary image segments) by the processor 108, based on the image parameters to be determined. The binary image format may also be segmented based on resolution of the image. The binary image segments can also be referred as kernels or grids or matrix, and the segments can be kernel based segments or word-based segments. The kernel-based segments can be traversed by the processor 108, using a sliding window on the plurality of the binary image segments of the image. The processor 108 is configured to determine an image parameter value (also referred as contextual quality values/distortion values) for each of one or more image parameters for the plurality of binary image segments associated with the image. The one or more image parameters can include at least one of, but not limited to, brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, bleed-throughs, and the like. Further, the processor 108 is configured to determine the image parameter value corresponding to each image parameters of the entire image (also referred as contextual quality score), based on the image parameter value of each binary image segments.

In an embodiment, the processor 108 is configured to compare the image parameter value of each of one or more image parameters with corresponding intermediate pre-defined threshold values. Based on the comparison, the image can be retained if the image parameter value is above the intermediate threshold value or discarded the image if the image parameter value is below the intermediate threshold value. The combination of the image parameter values of each of one or more image parameters may be used to determine a suitability value and an impact value for the image. The processor 108 determines the suitability value and the impact value corresponding to the image, based on the image parameter value for each of the one or more image parameters determined for the image. The suitability value depicts an overall quality of the image to be suitable for OCR conversion in order to determine processing steps, and the impact value depicts the direct consequence of the OCR conversion of the image due to the impact of one or more image parameters during processing of the image. The processor 108 determines a quality score (also referred as a Contextual Image Quality Score (CIQS)) for the image, based on the suitability value and the impact value. The processor 108 is configured to transmit the image for processing before the OCR conversion, upon determining the quality score to be above an overall pre-defined threshold value. The processing of the image may be based on the image parameter value of the each of one or more image parameters of the image.

Figure 2:
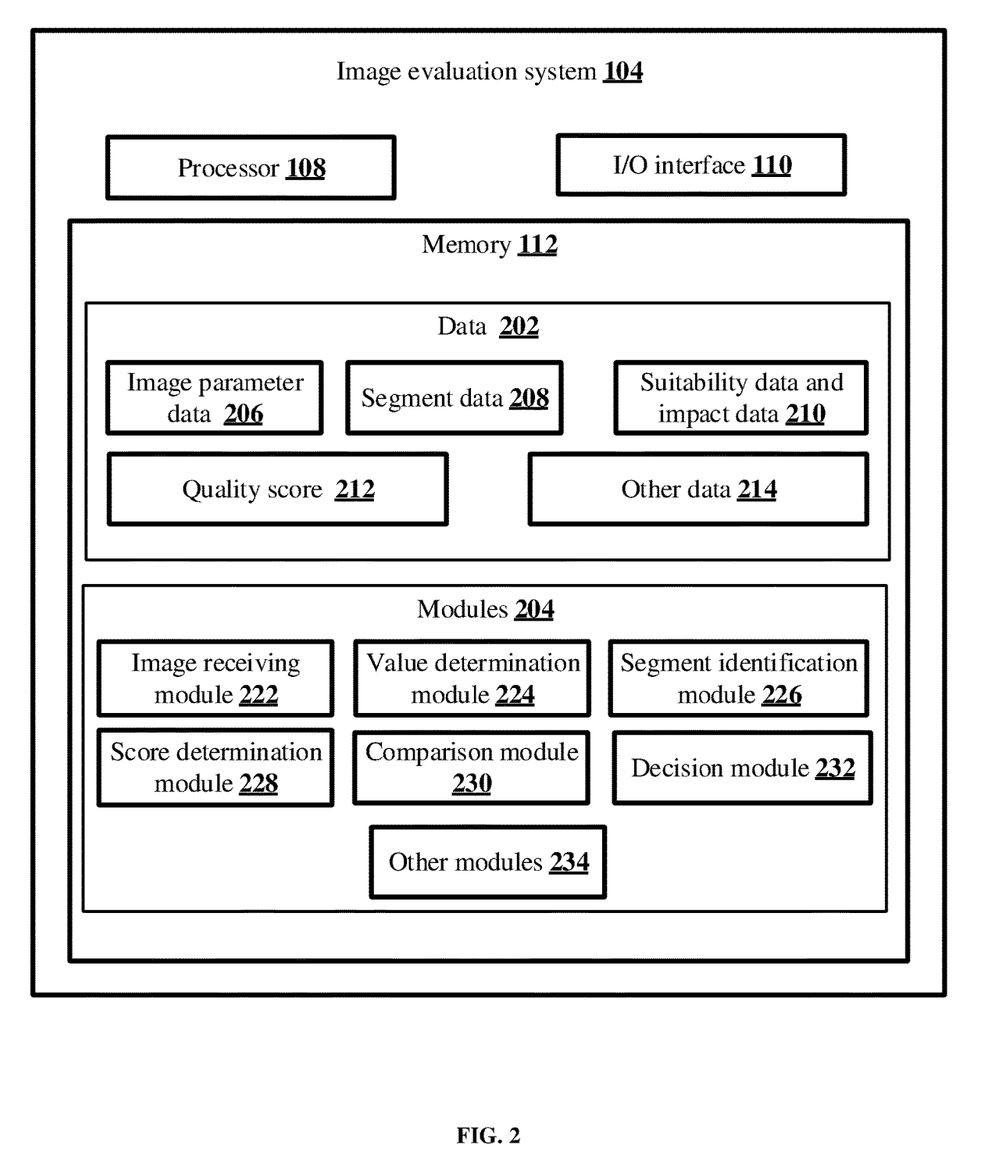
FIG. 2 illustrates a block diagram of an image evaluation system in accordance with some embodiments of the present disclosure.

FIG. 2 illustrates a block diagram of an image evaluation system 104 in accordance with some embodiments of the present disclosure.

In some implementations, the image evaluation system 104 may include data 202 and modules 204. As an example, the data 202 may be stored in a memory 112 configured in the image evaluation system 104 as shown in the FIG. 2. In one embodiment, the data 202 may include, image parameter data 206, segment data 208, suitability data and impact data 210, quality score 212 and other data 214.

In some embodiments, the data 202 may be stored in the memory 112 in form of various data structures. Additionally, the data 202 can be organized using data models, such as relational or hierarchical data models. The other data 214 may store data, including temporary data and temporary files, generated by the modules 204 for performing the various functions of the image evaluation system 104.

In some embodiments, the data 202 stored in the memory 112 may be processed by the modules 204 of the image evaluation system 104. The modules 204 may be stored within the memory 112 as shown in FIG. 2. In an example, the modules 204 communicatively coupled to the processor 108 configured in the image evaluation system 104, may also be present outside the memory 112 and implemented as hardware. As used herein, the term modules 204 may refer to an application specific integrated circuit (ASIC), a FPGA (Field Programmable Gate Array), an electronic circuit, a processor (shared, dedicated, or group) and memory that execute one or more software or firmware programs, a combinational logic circuit, and/or other suitable components that provide the described functionality. In some other embodiments, the modules 204 may be implemented using at least one of ASICs and FPGAs.

In some embodiments, the modules 204 may include, for example, an image receiving module 222, a value determination module 224, a segment identification module 226, a score determination module 228, a comparison module 230, a decision module 232 and other modules 234. The other modules 234 may be used to perform various miscellaneous functionalities of the image evaluation system 104. It will be appreciated that such aforementioned modules 204 may be represented as a single module or a combination of different modules.

In an embodiment, the image receiving module 222 may receive an image comprising optical character data. Further, the value determination module 224 may determine the image parameter value for each of one or more image parameters of the image. The image parameter data 206 may include one or more image parameters. The one or more image parameters may include at least one of, but not limited to, brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, bleed-throughs, and the like. As an example, the image parameter value can be an image parameter value for brightness, image parameter value for warp, image parameter value for skewness, and the like. The image parameter value can also include distortion values of the brightness, skewness, warp and the like of the image.

The value determination module 224 may determine the image parameter value for each of one or more image parameters of the image. The image parameter data 206 includes image parameter value. For example, for a given image parameter of the image, the image parameter value of each binary image segment is combined to determine image parameter value of the image.

The value determination module 224 may determine image parameter value for each of the one or more image parameters for a plurality of binary image segments identified, by the segment identification module 226, in the image. The segment data 208 may include the plurality of binary image segments. As an example, the binary image segments can be kernel segments, grid segments, matrix segments and the like. The identification of the segments can be based on the resolution of the image. For example, the image has 9 pixels, then the segment may be identified as 3×3 segment. Further, the segment identification module 226 may also divide the image into segments based on the identified number of segments for each of the one or more image parameters. Furthermore, the segment identification module 226 may determine a segment value of each segment of the plurality of binary image segments, with respect to each of the one or more image parameters. The segment data 208 includes segment value of each segment of the plurality of binary image segments. The value determination module 224 may determine the suitability value and the impact value corresponding to the image, based on the image parameter value for each of the one or more image parameters determined for the image. The suitability data and impact data 210 includes the suitability value and the impact value. For example, the suitability value can be a metric depicting the overall quality of the image which are/are not suitable for the OCR conversion, and the impact value depicts the direct consequence of the OCR conversion of the image due to the impact of one or more image parameters. Further, the overall quality score of the image may be determined by the score determination module 228 using the suitability value and the impact value. The value determination module 224 may correlate the segment value of each segment with other segments of the image, to determine the image parameter value for each of the one or more image parameters of the image.

The score determination module 228 may determine the quality score for the image, based on the suitability value and the impact value. The quality score for the image is determined based on weighted average of the suitability value and the impact value. The quality score depicts the distortion in the image due to one or more image parameters. Further, based on the overall quality score, the processing steps that need to be followed before OCR may be determined, to achieve better accuracy in OCR.

The comparison module 230 may determine the quality score to be above or below the overall pre-defined threshold value. The decision module 232 may decide whether to retain the image or discard the image based on the comparison. The comparison module 230 may also compare the image parameter value of each of the one or more image parameters with an intermediate pre-defined threshold value. Based on the comparison of the image parameter value of each of the one or more image parameters with an intermediate pre-defined threshold value, the decision module 232 may decide whether to retain the image or discard the image.

The other modules 234 may correct the image with respect to each of the one or more image parameters by considering the corresponding image parameter value. The other modules 234 may divide the image into the plurality of the binary image segments.

Figure 3:
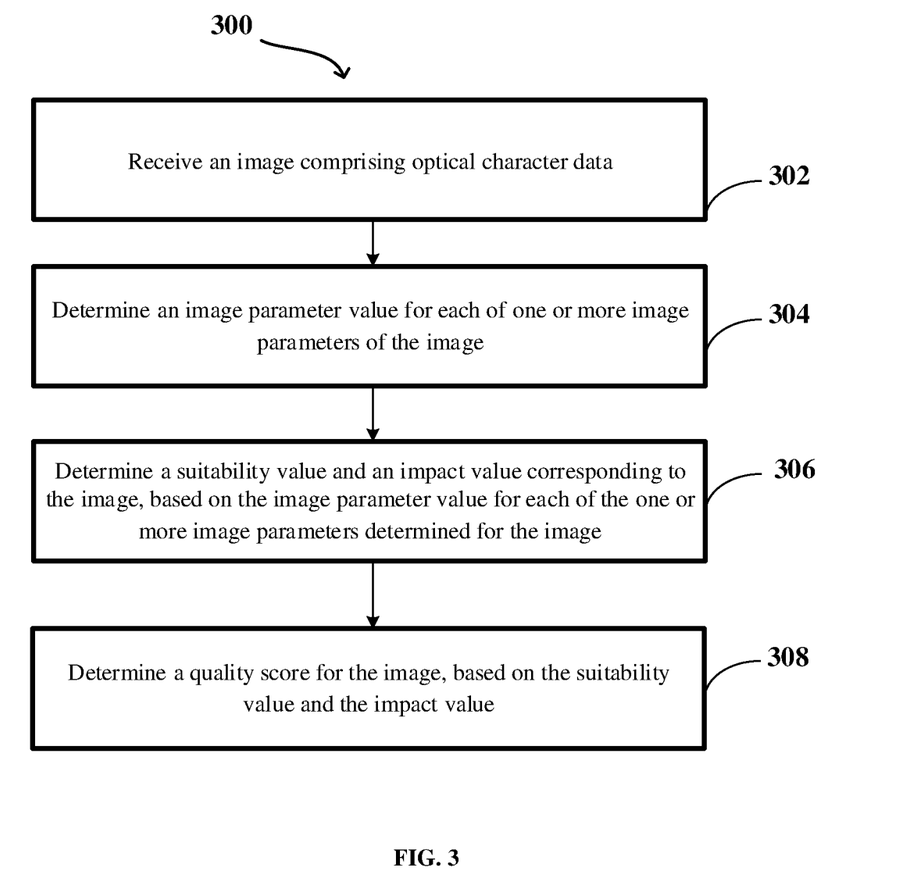
FIG. 3 is a flowchart depicting a method for evaluating an image quality for Optical Character Recognition (OCR) in accordance with some embodiments of the present disclosure.

FIG. 3 is a flowchart depicting a method 300 for evaluating an image quality for Optical Character Recognition (OCR) in accordance with some embodiments of the present disclosure.

As illustrated in FIG. 3, the method 300 comprises one or more blocks illustrating a method for evaluating an image quality for Optical Character Recognition (OCR). The method 300 may be described in the general context of computer-executable instructions. Generally, computer-executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 302, the method 300 may include receiving, by the image evaluation system 104, an image comprising optical character data.

At block 304, the method 300 may include determining, by the image evaluation system 104, an image parameter value for each of one or more image parameters of the image. In an embodiment the one or more image parameters includes at least one of brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, and bleed-throughs and the like. In an embodiment, the image parameter value for each of the one or more image parameters of the image comprises the image parameter value for each of the one or more image parameters determined for a plurality of binary image segments identified in the image. In an embodiment, the plurality of binary image segments are identified based on the image resolution. In an embodiment, the binary image segments include traversing of the segments (i.e. kernels) using a sliding window.

In an embodiment, the image parameter value of each binary image segment is combined to arrive at the image parameter value of the image, wherein the combining of image parameters value of each binary image segment is performed for each of one or more image parameters.

At block 306, the method 300 may include determining, by the image evaluation system 104, the suitability value and the impact value corresponding to the image, based on the image parameter value for each of the one or more image parameters determined for the image.

At block 308, the method 300 may include determining, by the image evaluation system 104, the quality score for the image, based on the suitability value and the impact value. In an embodiment, the image is transmitted for processing before the OCR, upon determining the quality score to be above an overall pre-defined threshold value. In an embodiment, the quality score for the image is determined based on weighted average of the suitability value and the impact value.

Figure 4A:
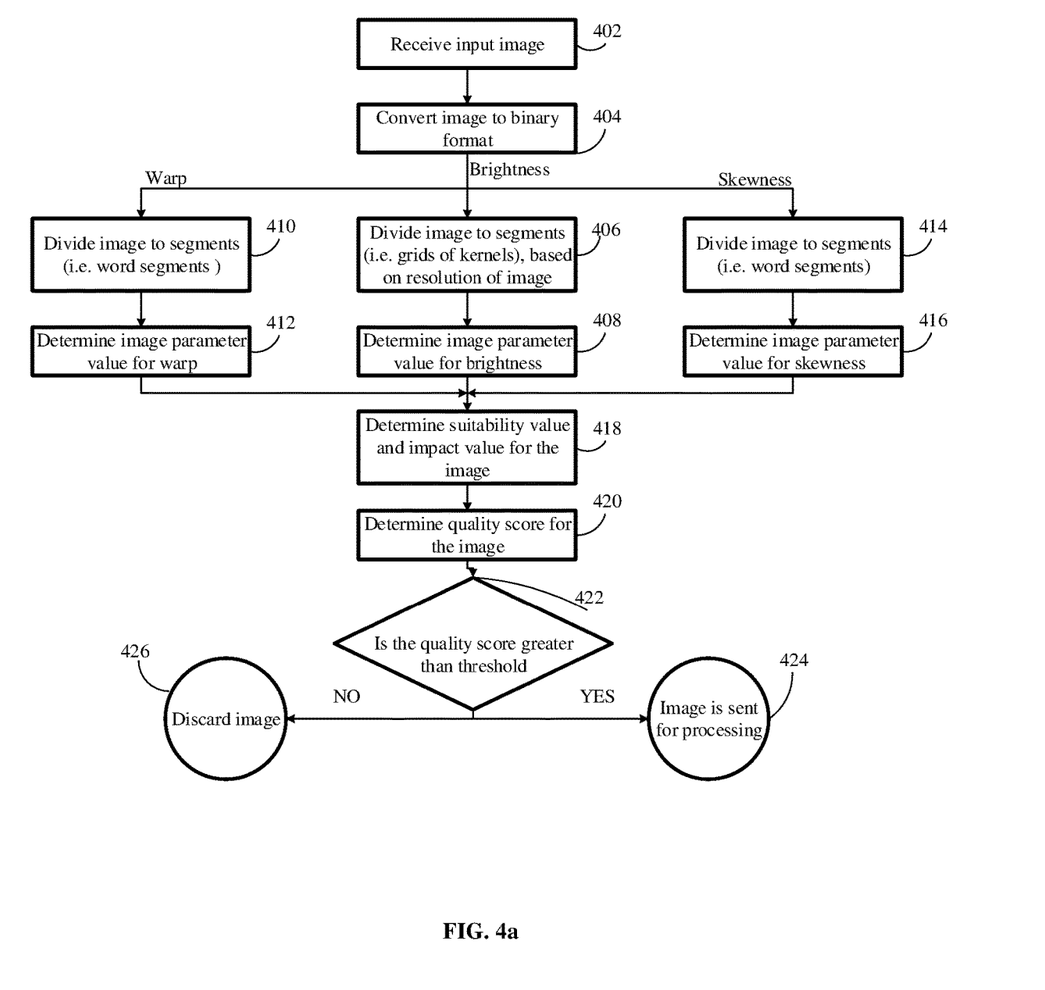
FIG. 4a is an exemplary flowchart illustrating exemplary scenario depicting a method for evaluating an image quality for Optical Character Recognition (OCR) in accordance with some embodiments of the present disclosure.

FIG. 4a is an exemplary flowchart illustrating exemplary scenario depicting a method for evaluating an image quality for Optical Character Recognition (OCR) in accordance with some embodiments of the present disclosure.

At block 402, the image is retrieved from the image capturing device 102 or from the database 106. At block 404, the image is converted to binary image format, by the image evaluation system 104. For example, the image may be initially converted to grey scale image and then the image may be binarized. Further, based on the one or more image parameters to be determined, the image parameter values for the image is determined. For exemplary purposes, only three image parameters have been considered here. Similar method would be followed for all the image parameters. The one or more image parameters such as brightness image parameter value, skewed image parameter value, warped image parameter value, have been considered, to determine the image parameter values of the image based on a context in which the one or more image parameter appear in the image. The exemplary problematic images are shown in the FIG. 4b-4d, where FIG. 4b depicts an image with low brightness, for, example invoice 428, FIG. 4c depicts an image with skewness, for example, checklist 430, FIG. 4d depicts an image with warp, for example, hotel bill 432.

Figure 4B:
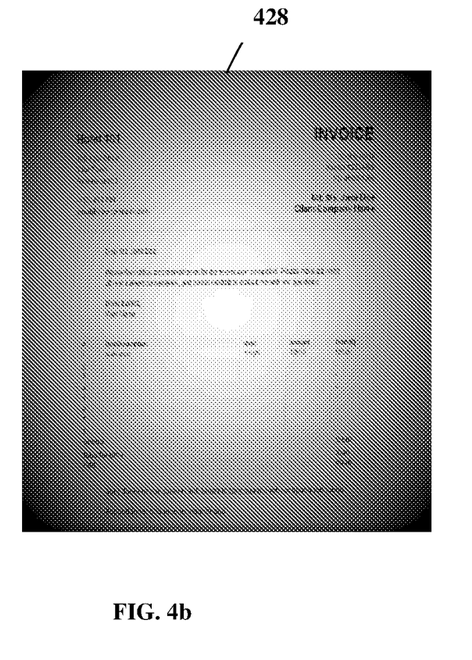
FIGS. 4b-4d show exemplary representations of images in accordance with some embodiments of the present disclosure.
Figure 4C:
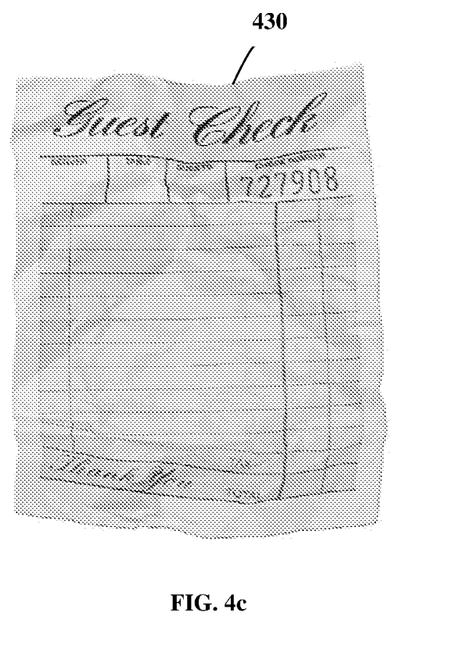
Figure 4D:
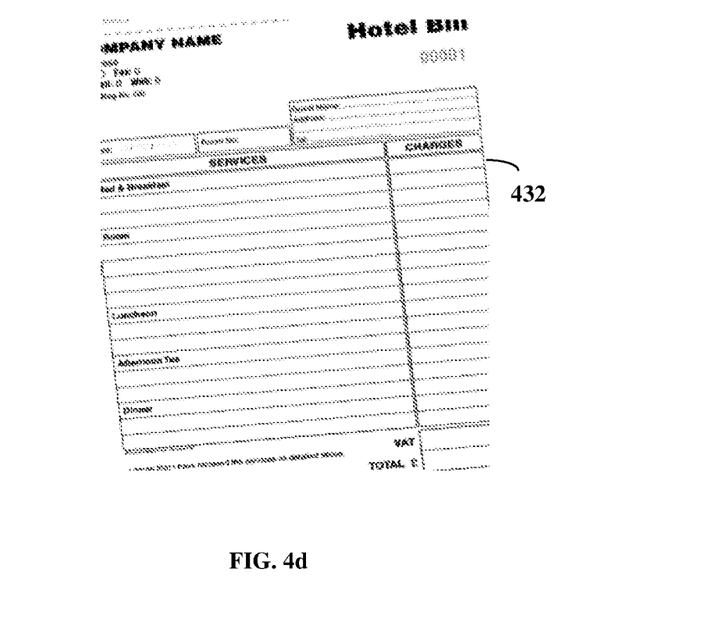

The image parameter value for brightness image parameter of the invoice 428 image shown in FIG. 4b, may be determined by the image evaluation system 104. At block 406, the image is divided into binary image segments, by the image evaluation system 104, based on the resolution of the image. For example, the binary image segments can be grids of kernels. At block 408, the image parameter value for the brightness image parameter of the plurality of binary image segments of the image is determined by the image evaluation system 104. The brightness image parameter value of the plurality of binary image segments is correlated to determine the brightness image parameter value of the image.

For example, the binarized image may be divided into binary image segments. The image can be divided into multiple binary image segments, based on the image resolution. For example, size of the binary image segment can be 3×3, 5×5, or 7×7, based on the resolution of the image. The binary image segments can include a grid of kernels and a sliding window. The sliding window can be a kernel based sliding window and traverses across the plurality of the binary image segments with single size window. For example, the binarized image may be divided into 3×3 binary image segment with a sliding window of size '1'. If, the image with plurality of 3×3 binary image segments, then each binary image segment of the image may have 9 pixels. For example, the sliding window traverses in clockwise direction by each binary image segment.

To determine the image parameter value of brightness (herein after referred as brightness image parameter value) of each binary image segment in the image, the kernel is traversed in clockwise direction on the binary image segments, to obtain the brightness image parameter value of each binary image segment of the image. For example, if the pixel value of the binary image segment is '0', then the brightness image parameter value of the binary image segment is incremented by '1' and if the pixel value of the binary image segment is '1', then the brightness image parameter value of the binary image segment is not incremented. Accordingly, the count the brightness image parameter value of the binary image segment incremented by '1' depicts that the brightness of the corresponding binary image segment is low. Further, the brightness image parameter value of the binary image segment is determined for all four sides of the binary image segment, and the difference between opposite sides of the binary image segment in the image may provide the brightness image parameter value for each binary image segment of plurality of binary image segments.

Consider, an example binary image segment from the invoice 428 image shown in FIG. 4b, and the example segment values are:

0 0 1

0 0 1

0 0 0

When the kernel of size '1' is traversed on the above binary image segment, from top left in clockwise direction, the brightness image parameter for each side of the binary image segment can be obtained. For example, the top of binary image segment can have the brightness image parameter value of '1' for binary image segment, when moved from first '0' to second '0', as the brightness is low in this case. Further, in next step when the kernel is traversed from '0' to '1', then the brightness image parameter value of the binary image segment may not be incremented. Hence, the brightness image parameter value of the binary image segment is '1'. Similarly, the brightness image parameter value for all four sides of the binary image segment is determined with direction using vector-based values.

$$0 \quad \rightarrow(+1) \quad 0 \quad \rightarrow(+0) \quad 1$$
$$0 \quad\quad\quad\quad 0 \quad\quad\quad\quad 1$$
$$0(+1) \quad\quad \leftarrow 0 \quad (+1) \quad \leftarrow 0$$

Accordingly, the brightness image parameter values of the binary image segment are:

Top count: 1, Right count: 1, Bottom count: 2, Left count: 2

In the next step, a difference between the brightness image parameter value of opposite sides of the binary image segment is determined. The brightness image parameter value is '1' if the 'top count' of the binary image segment is subtracted with the 'bottom count' of the binary image segment, with the direction left. Further, the 'left count' subtracted with the 'right count', with the direction top, then the brightness image parameter value of the binary image segment is '2'. This approach can be carried out for all the binary image segments in the image.

The brightness image parameter value for one binary image segment is determined by performing vector addition of two perpendicular sides of the binary image segment. By performing the vector addition of the perpendicular sides of the binary image segment, a context of brightness in the binary image segment may be determined, as the edges of each binary image segment are shared with the neighboring binary image segment during traversing of kernel based sliding window. The vector addition of the brightness image parameter value of one or more binary image segment is performed using equation below:

$$\vec{m} + \vec{n} = \vec{a}$$

Magnitude of vector of brightness image parameter value of binary segment=$|\vec{m+n}|=\sqrt{m^2+n^2+2\,mn\,\cos\theta}$ Where, 'm' can be one vector from left to right of the binary image segment and 'n' can be one vector from top to bottom of the binary image segment. Both vectors 'm' and 'n' may always be at 90° as the binary image segment is a square. The vector may form two sides of the square.

In an example consider, the vector $\vec{m}=1$ towards left, vector $\vec{n}=2$ towards top, and $\theta=90°$. By performing vector addition of the brightness image parameter value of binary image segment the magnitude of the vector is obtained as below, $$|m+n| = \sqrt{(1^2 + 2^2 + 2*1*2\,\cos(90))}$$
$$= \sqrt{(1 + 4 + (4*0))}$$
$$= \sqrt{5}$$
$$= 2.236$$

The brightness image parameter value of 2.236 is obtained for one binary image segment of plurality of binary image segments. Similarly, the brightness image parameter values are obtained for all the binary image segments in the image, and each binary image segment is correlated with the plurality of binary image segments of the image to determine the brightness image parameter value for the image.

In an example, a quality score for brightness (herein after referred as brightness quality score) of the image can also be individually obtained using equation below:

quality score for brightness image $$\text{parameter} = \frac{\left(\frac{d}{2}\sqrt{a^2} + b^2 + c^2 + \ldots + n^2\right)}{N}$$

The brightness quality score obtained from above equation can be considered as Result (1). Where, d=unit distance between 2 units. Consider the value of d=1, further, a, b, c ..., n=brightness image parameter value of each binary image segment respectively, N=number of binary image segments in the image.

For example, consider the resolution of image is 300×300. Then the number of binary image segments in the image are:

$$N=100*100=10,000$$

Accordingly, using the equation of the brightness quality score, the brightness quality score of image may also be determined for the brightness image parameter.

Referring back to the FIG. 4a, at block 410, the image is divided into binary image segments, by the image evaluation system 104, based on number of words in the image. For example, the binary image segments can be of words segments and the word segments may be segmented using grids of kernels. At block 412, the image parameter value for the warp (herein after referred as warp image parameter value) of the plurality of binary image segments of the image is determined by the image evaluation system 104. The warp image parameter value of the plurality of binary image segments is correlated to determine the warp image parameter value of the image.

For example, consider the warp image parameter value of the checklist 430 image shown in FIG. 4c is to be determined. The word segments can be a segment of each word in the image shown in FIG. 4c. For example, in the checklist 430 the word 'GUEST' may be separately segmented, and to the collective word segments the grids of kernels may be traversed. To determine the warp image parameter value for each binary image segment, kernel may be traversed in the clockwise direction to obtain the warp image parameter value of the binary image segment. For example, if the pixel value of one of the binary image segment of the word 'GUEST', is '0', then the warp image parameter value of corresponding binary image segment may be incremented by '1' and if the pixel value is '1', then the warp image parameter value of the corresponding binary image segment may not incremented. Accordingly, the count of the warp image parameter value of the binary image segment incremented by '1' depicts that the warp of the image is more in the corresponding binary image segment. Further, the warp image parameter value is determined for all four sides of the binary image segment, and the difference between opposite sides of the binary image segment in the image may provide the warp image parameter value for each binary image segment of the plurality of binary image segment.

Consider, an example binary image segment of word 'GUEST' from the image of the checklist 430, and the example segment values are:

1 1 1

0 1 0

1 0 0

1 1 0

When the kernel of size '1' is traversed from top left in clockwise direction, the warp image parameter value for each side of the binary image segment can be obtained. Each row is traversed till a row with at least one pixel with the value '1' is found and then the circuit may be started from the pixel with the value '1'. When the pixel value is '1', the warp image parameter value of the binary image segment is incremented by '1' and when the pixel value is '0', the warp image parameter value of the binary image segment may not be incremented. Hence, the warp image parameter value for top of the circuit in the example is '3'. Similarly, the warp image parameter value for all four sides of the binary image segment is determined.

Accordingly, the warp image parameter values of the binary image segment are:

Top count: 3, Right count: 1, Bottom count: 2, Left count: 3

In the next step, a difference between the warp image parameter value of opposite sides of the binary image segment is determined. The warp image parameter value is '1', if the 'top count' of the binary image segment is subtracted with 'bottom count' of the binary image segment, with the direction right. Further, the left count subtracted with right count, the warp image parameter value of the binary image segment can be '2', with the direction down. This approach can be carried out for all the binary image segments in the image. A word 'GUEST' segment can have a different warp image parameter value.

Further, the warp image parameter value of each binary image segment may be correlated with warp image parameter value of all the other segments in the image and the value clusters may be formed to determine the warp image parameter value for the image. Further, the words which are not warped may have similar warp image parameter value with respect to other warp image parameter value. However, the words which are warped may have a different warp image parameter value which can be higher than the most frequent image parameter value in the image. When the image parameter values are clustered, the warped segments of the image may fall outside the cluster of normal words. For example, in the checklist 430 of FIG. 4c there may be around 20 words. Out of 20 words, 6 words could be distorted, and the 6 words warp image parameter values may fall out of the cluster, Therefore, $$N=6 \rightarrow \text{Result} \qquad (2)$$

Referring back to FIG. 4a, at block 414, the image is divided into binary image segments, by the image evaluation system 104, based on number of words in the image. At block 416, the image parameter value for the skewness (herein after referred as skew image parameter value) of the plurality of binary image segments of the image is determined by the image evaluation system 104. The skew image parameter value of the plurality of binary image segments is correlated to determine the skew image parameter value of the image.

For example, consider the skew image parameter value of the hotel bill 432 image shown in FIG. 4d is to be determined. The word segments can be a segment of each word in the image of hotel bill 432 shown in FIG. 4d. For example, in the hotel bill 432, the word 'SERVICES' may be separately segmented, and to the collective word segments the grids of kernels may be traversed. To determine the skew image parameter value for each binary image segment, kernel may be traversed in the clockwise direction to obtain the skew image parameter value of the binary image segment. For example, if the pixel value of one of the binary image segment of the word 'SERVICES', is '0', then the skew image parameter value of the binary image segment is incremented by '1' and if the pixel value is 1, then the skew image parameter value of the binary image segment is not incremented. Accordingly, the count of the skew image parameter value of the binary image segment incremented by '1' depicts that the skewness (i.e. tilt) of the image is more in the corresponding binary image segment. Further, the skew image parameter value is determined for all four sides of the binary image segment, and the difference between opposite sides of the binary image segments in the image may provide the skew image parameter value for each binary image segment of the plurality of binary image segment.

Consider, an example binary image segment of word 'SERVICES' from the image hotel bill 432 of FIG. 4d, and the example segment values are:

1 1 1
0 1 0
1 0 0
1 0 0

When the kernel of size '1' is traversed from top left in clockwise direction, the skew image parameter value for each side of the binary image segment can be obtained. Each row is traversed till a row with at least one pixel with the value '1' is found and then the circuit is started from the pixel with the value '1'. When the pixel value is '1', the skew image parameter value of the binary image segment is incremented by '1' and when the pixel value is '0', the skew image parameter value of the binary image segment is not incremented. Hence, the skew image parameter value for top of the circuit in this example is '3'. Similarly, the skew image parameter value for all four sides of the binary image segment is determined.

Accordingly, the skew image parameter values of the binary image segment are:

Top count: 3, Right count: 1, Bottom count: 1, Left count: 3

In the next step, a difference between the skew image parameter value of opposite sides of the binary image segment is determined. The skew image parameter value is '2', if the top count of the binary image segment is subtracted with bottom count of the binary image segment, with the direction right. Further, the left count subtracted with right count, the skew image parameter value of the of the binary image segment can be '2', with the direction down. This approach can be carried out for all the binary image segments in the image. A word 'SERVICES' segment can have a different skew image parameter value.

Further, the skew image parameter value for one binary image segment is determined by performing vector addition of two perpendicular sides of the binary image segment. By performing the vector addition of the perpendicular sides of the binary image segment, a context of skew in the binary image segment may be determined, as the edges of each binary image segment is shared with the neighboring binary image segment during traversing of kernel based sliding window. The vector addition of the skew image parameter value of one or more binary image segment is performed using equation below:

$$\vec{m} + \vec{n} = \vec{a}$$

Magnitude of vector of skew image parameter value of binary segment $= |m+n| = \sqrt{(m^2+n^2+2\ mn\ \cos\theta)}$ In the example consider, the vector $\vec{m}=2$ towards right, vector $\vec{n}=2$ towards bottom, and $\theta=90°$. By performing vector addition of the skew image parameter value of binary image segment the magnitude of the vector is obtained as below, $$|m+n| = \sqrt{(2^2 + 2^2 + 2*1*2\ \cos(90))}$$
$$= \sqrt{(4 + 4 + (4*0))}$$
$$= \sqrt{8}$$
$$= 2.82$$

The skew image parameter value of 2.82 is obtained for one binary image segment of plurality of binary image segments. Similarly, the skew image parameter values are obtained for all the binary image segments in the image, and each binary image segment is correlated with the plurality of binary image segments of the image to determine the skew image parameter value for the image. Also, the skew image parameter value of each binary image segment may be compared with all the segments in the image. After the skew image parameter value and, a skew angle (tilt angle) for the image is obtained, the magnitude vector obtained above may be compared with the pre-defined skew image parameter values. The difference between the obtained skew image parameter values and the pre-defined skew image parameter values may provide the amount of skewness in the image along with the skew angle. The determined skew angle can be considered as Result (3).

In an example, a quality score for skew (herein after referred as skew quality score) of the image can also be individually obtained using equation below:

$$\text{quality score for skew image parameter} = \frac{\left(\frac{d}{2}\sqrt{a^2 + b^2 + c^2 + \ldots + n^2}\right)}{N}$$

Where, d=Unit distance between 2 units. Consider the value of d=1, further, a, b, c . . . , n=skew image parameter value of each binary image segment respectively, and N=number of binary image segments in the image.

Subsequently, at block 418, the image parameter values of the image such as the brightness image parameter value, the warp image parameter value, and the skew image parameter value, are combined to determine the suitability value and the impact value of the image, by the image evaluation system 104.

For example, the product of percentage values of all the image parameter values can be considered to obtain the suitability value of the image.

Suitability value of the image=SW*Brightness image parameter value %*Skewness image parameter value %* . . . *$N$ image parameter value %

The value 'SW' in the equation can vary depending on the numbers of image parameter values is determined and the 'N' is the final image parameter value to be included in the equation.

In an example, the overall brightness image parameter value after computation in the above example of calculating magnitude of vector of the brightness image parameter value is 0.22, and the skewness image parameter value is 0.28, and with two image parameter values, the suitability value is:

Suitability value=20*0.22*0.28=1.232,

Where, the value of SW is considered for example, as 20. The 'SW' value is based on number of image parameters considered, here, for example 20 image parameters may be taken into consideration.

Further, the impact value of the image is computed using the equation:

Impact=1−{(1−brightness value %)*(1−skewness value %)* . . . *(1−$n$ %)}

Wherein, the impact value is a probability-based score and may need to be less than '1'.

For example:

$$\text{Impact value} = 1 - \{(1 - 0.22) * (1 - 0.28)\}$$
$$= 1 - \{0.78 * 0.72\}$$
$$= 1 - 0.5616$$
$$= 0.4384$$

Further, at block 420, the quality score for the image is determined by the image evaluation system 104, using the suitability value and the impact value of the image. For example, using the suitability value and the impact values, the quality score (also referred as (overall Contextual Image Quality Score (CIQS)) of the image can be determined.

Quality score of the image=($w1$*Impact value)+($w2$*Suitability value)

Where, w1 and w2 are the weightage provided to the impact value and suitability value respectively.

For example, using the suitability value of 1.232 and the impact value of 0.4384 obtained above, the weights for example, 0.6 out of weight '1' to impact value and 0.4 out of weight '1' to the suitability value, the quality score of the image is obtained as below:

$$\text{Quality score of the image} = (0.6 * 0.4384) + (0.4 * 1.232)$$
$$= 0.263 + 0.492$$
$$= 0.755$$

As an example, higher weightage for example 0.6, may be provided to impact value (metric) and lesser weightage may be provided to suitability value (metric). These weightages can be varied based on the requirement. Further, if the quality score is less than overall pre-defined threshold value of 0.5, then the image may be discarded, else it can be sent for correction. In an example, the first step can be correcting skewness of the image by rotating the image in the opposite direction of the vector by the obtained angle. Then, the brightness of the image is adjusted to an average level for all the binary image segments. If the brightness is low, then brightness of the binary image segments is increased and if the brightness is high, then the brightness of binary image segments is decreased. After adjusting the brightness, the warped segments can be reconstructed using suitable methods such as trimmed median.

At block 422, the quality score of the image is compared with overall pre-defined threshold value, by the image evaluation system 104. At block 424, the image is sent for processing (i.e. correcting the image), by the image evaluation system 104, if the quality score of the image is above the overall pre-defined threshold value. At block 426, the image may be discarded by the image evaluation system 104, if the quality score of the image is below the overall pre-defined threshold value. The quality scores of each of one or more image parameters (such as the brightness, warp, skew quality score) may be used during the processing of the image. Furthermore, the quality scores of each of one or more image parameter can be compared with the intermediate pre-defined threshold to discard or retain the image. For example, for brightness and warped image parameter of the image, the quality score could be between 1-3 to process the image, and for skewness image parameter of the image, the image should not be rotated higher than 90°. Similarly, for other features the intermediate threshold values may be pre-defined.

Further, based on Result (1), (2), and (3), the correction of the image may be performed. Further, the selection of pattern/sequence of correction of the image may be performed based on the quality score and the image parameter value of the image. Further, selection of segments for pattern/sequence of correction of the image can also be performed based on the quality score or the image parameter values of the image. Similarly, for each image parameter, the corresponding quality score is used to select the sequence of processing the image. After the processing, the image is sent to OCR for converting the image to text format.

For example, if the brightness image parameter value of the image is greater than or equal to 3 or less than or equal to 0.5, then the image may be discarded. The brightness image parameter value above 3, is considered to be darker and the brightness image parameter value less than 0.5 is brighter (e.g. image with flash) to process the image. If the brightness image parameter value is between 0.5 and 3, then the skewness of the image is corrected. For example, with Result (3), the skewness image parameter of the image along with the direction of angle is obtained. If the skewness image parameter is greater than 45° and less than 90° then the image may be discarded. After correcting the skewness of the image, the warp of the image is corrected. Accordingly, if the number of warped segments is higher than 10% of the overall binary image segments in the image, then the image may be discarded, else the image may be sent for processing. Similarly, the quality scores for various image parameters such as at least one of, but not limited to, water marks, text overlaps, handwritten and optical character identifications, text with shadows, varying fonts, mixed-alphabets, shadow effects, noisy backgrounds, paper punching marks, scratches and cracks, carbon copy effects, folding marks, thorn-off regions, bleed-throughs and the like may be determined.

Figure 5:
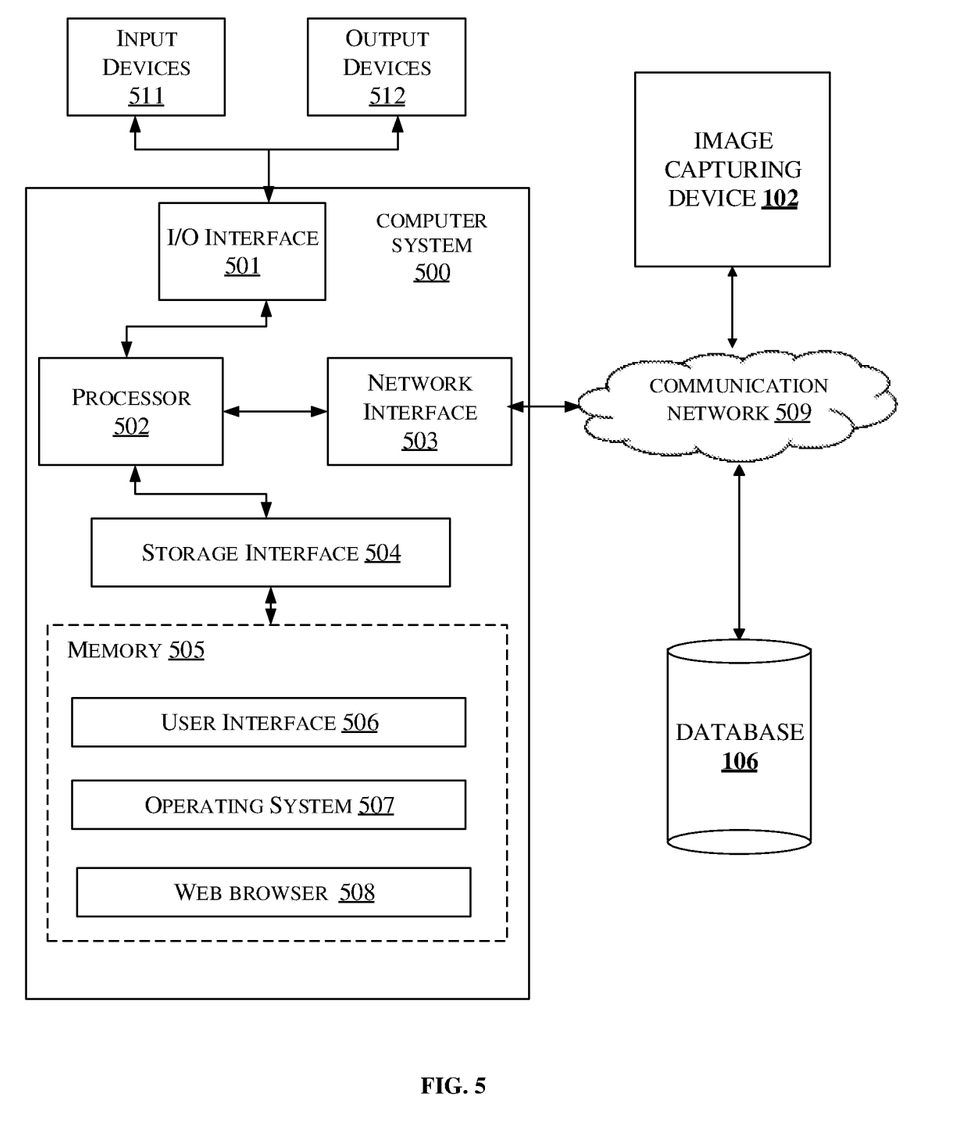
FIG. 5 is a block diagram of an exemplary computer system for implementing embodiments consistent with the present disclosure.

FIG. 5 is a block diagram of an exemplary computer system for implementing embodiments consistent with the present disclosure.

In some embodiments, FIG. 5 illustrates a block diagram of an exemplary computer system 500 for implementing embodiments consistent with the present invention. In some embodiments, the computer system 500 can be image evaluation system 104 that is used for evaluating the image quality for Optical Character Recognition (OCR). The computer system 500 may include a central processing unit ("CPU" or "processor") 502. The processor 502 may include at least one data processor for executing program components for executing user or system-generated business processes. A user may include a person, a person using a device such as those included in this invention, or such a device itself. The processor 502 may include specialized processing units such as integrated system (bus) controllers, memory management control units, floating point units, graphics processing units, digital signal processing units, etc.

The processor 502 may be disposed in communication with input devices 511 and output devices 512 via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 501, the computer system 500 may communicate with the input devices 511 and the output devices 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may communicate with plurality of the image capturing device 102 and database 106. The communication network 509 can be implemented as one of the different types of networks, such as intranet or Local Area Network (LAN), Closed Area Network (CAN) and such. The communication network 509 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc. The image capturing device 102 may include, but not limited to, cameras, scanning device, smartphone, tablet, and the like. In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, a user interface 506, an operating system 507, a web browser 508 etc. In some embodiments, the computer system 500 may store user/application data, such as the data, variables, records, etc. as described in this invention. Such databases may be implemented as fault-tolerant, relational, scalable, secure databases such as Oracle or Sybase.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM®OS/2®, MICROSOFT® WINDOWS® (XP®, VISTA®/7/8, 10 etc.), APPLE® IOS®, GOOGLE™ ANDROID™, BLACKBERRY® OS, or the like. The User interface 506 may facilitate display, execution, interaction, manipulation, or operation of program components through textual or graphical facilities. For example, user interfaces may provide computer interaction interface elements on a display system operatively connected to the computer system 500, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, JavaScript®, AJAX, HTML, Adobe® Flash®, etc.), or the like.

In some embodiments, the computer system 500 may implement the web browser 508 stored program components. The web browser 508 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 508 may utilize facilities such as AJAX, DHTML, ADOBE® FLASH®, JAVASCRIPT®, JAVA®, Application Programming Interfaces (APIs), etc. In some embodiments, the computer system 500 may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Present Disclosure

Embodiments herein improves the accuracy of the Optical Character Recognition (OCR) of the image. Embodiments herein can retain or discard the images which are of poor quality to overcome the errors during OCR conversion. Embodiments herein enables the correction of images having poor quality due to low brightness, skewness, warp and so on, by determining image quality values to provide better accuracy during the OCR.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for evaluating an image quality for Optical Character Recognition (OCR). The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
|---|---|
| 100 | Architecture |
| 102 | Image capturing device |
| 104 | Image evaluation system |
| 106 | Database |
| 108 | Processor |
| 110 | I/O interface |
| 112 | Memory |
| 114 | Image |
| 202 | Data |
| 204 | Modules |
| 206 | Image parameter data |
| 208 | Segment data |
| 210 | Suitability data and impact data |
| 212 | Quality score |
| 214 | Other data |
| 222 | Image receiving module |
| 224 | Value determination module |
| 226 | Segment identification module |
| 228 | Score determination module |
| 230 | Comparison module |
| 232 | Decision module |
| 234 | Other modules |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User interface |
| 507 | Operating system |
| 508 | Web browser |
| 509 | Communication network |
| 511 | Input devices |
| 512 | Output devices |

What is claimed is:

1. A method for evaluating an image quality for Optical Character Recognition (OCR) comprising:
receiving, by an image evaluation system, an image comprising optical character data;
determining, by the image evaluation system, an image parameter value for each of one or more image parameters of the image, wherein the image parameter value for each of the one or more image parameters of the image comprises the image parameter value for each of the one or more image parameters determined for a plurality of binary image segments identified in the image;

determining, by the image evaluation system, a suitability value and an impact value corresponding to the image, based on the image parameter value for each of the one or more image parameters determined for the image; and determining, by the image evaluation system, a quality score for the image, based on a weighted average of the suitability value and the impact value, wherein the image is transmitted for processing before the OCR, upon determining the quality score to be above an overall pre-defined threshold value.

2. The method as claimed in claim 1, further comprising:
comparing, by the image evaluation system, the image parameter value of each of the one or more image parameters with an intermediate pre-defined threshold value; and
performing, by the image evaluation system, one of retaining the image and discarding the image, based on the comparison.

3. The method as claimed in claim 1, wherein processing before the OCR comprises:
correcting, by the image evaluation system, the image with respect to each of the one or more image parameters by considering the corresponding image parameter value.

4. The method as claimed in claim 1, wherein determining the image parameter value for each of the one or more image parameters comprises:
dividing, by the image evaluation system, the image into the plurality of the binary image segments;
determining, by the image evaluation system, a segment value of each segment of the plurality of binary image segments, with respect to each of the one or more image parameters; and
correlating, by the image evaluation system, the segment value of each segment with other segments of the image, to determine the image parameter value for each of the one or more image parameters of the image.

5. The method as claimed in claim 1, wherein the one or more image parameters comprises at least one of brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, and bleed-throughs.

6. An image evaluation system for evaluating an image quality for Optical Character Recognition (OCR) comprising:
a processor; and
a memory communicatively coupled to the processor, wherein the memory stores processor-executable instructions, which, on execution, cause the processor to:
receive an image comprising optical character data;
determine an image parameter value for each of one or more image parameters of the image, wherein the image parameter value for each of the one or more image parameters of the image comprises the image parameter value for each of the one or more image parameters determined for a plurality of binary image segments identified in the image;
determine a suitability value and an impact value corresponding to the image, based on the image parameter value for each of the one or more image parameters determined for the image; and
determine a quality score for the image, based on a weighted average of the suitability value and the impact value, wherein the image is transmitted for processing before the OCR, upon determining the quality score to be above an overall pre-defined threshold value.

7. The image evaluation system as claimed in claim 6, wherein the processor is further configured to:
compare the image parameter value of each of the one or more image parameters with an intermediate pre-defined threshold value; and
perform one of retaining the image and discarding the image, based on the comparison.

8. The image evaluation system as claimed in claim 6, wherein for processing before the OCR, the processor is configured to:
correct the image with respect to each of the one or more image parameters by considering the corresponding image parameter value.

9. The image evaluation system as claimed in claim 6, wherein to determine the image parameter value for each of the one or more image parameters, the processor is configured to:
divide, the image into the plurality of binary image segments;
determine a segment value of each segment of the plurality of binary image segments with respect to each of the one or more image parameters; and
correlate the segment value of each segment with other segments of the image to determine the image parameter value for each of one or more image parameters of the image.

10. The image evaluation system as claimed in claim 6, wherein the one or more image parameters comprises at least one of brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, and bleed-throughs.

11. A non-transitory computer readable medium including instructions stored thereon that when processed by at least one processor causes an image evaluation system to perform operations comprising:
receiving an image comprising optical character data;
determining an image parameter value for each of one or more image parameters of the image, wherein the image parameter value for each of the one or more image parameters of the image comprises the image parameter value for each of the one or more image parameters determined for a plurality of binary image segments identified in the image;
determining a suitability value and an impact value corresponding to the image, based on the image parameter value for each of the one or more image parameters determined for the image; and
determining a quality score for the image, based on a weighted average of the suitability value and the impact value, wherein the image is transmitted for processing before the OCR, upon determining the quality score to be above an overall pre-defined threshold value.

12. The medium as claimed in claim 11, wherein the instructions cause the processor to:
compare the image parameter value of each of the one or more image parameters with an intermediate pre-defined threshold value; and perform one of retaining the image and discarding the image, based on the comparison.

13. The medium as claimed in claim 11, wherein for processing before the OCR, the instructions cause the processor to:
correct the image with respect to each of the one or more image parameters by considering the corresponding image parameter value.

14. The medium as claimed in claim 11, wherein to determine the image parameter value for each of the one or more image parameters, the instructions cause the processor to:
divide the image into the plurality of the binary image segments;
determine a segment value of each segment of the plurality of binary image segments, with respect to each of the one or more image parameters; and
correlate the segment value of each segment with other segments of the image, to determine the image parameter value for each of the one or more image parameters of the image.

15. The medium as claimed in claim 11, wherein the one or more image parameters comprises at least one of brightness, skewness, warps, water marks, text overlaps, handwritten and optical character identifications, text with shadows, varying fonts, mixed alphabets, shadow effects, noisy backgrounds, paper punching marks, scratches, cracks, carbon copy effects, folding marks, thorn-off regions, and bleed-throughs.

\* \* \* \* \*